May 10, 1960  H. D. SMITH  2,935,965
PORTABLE CHUTE

Filed May 9, 1956  3 Sheets-Sheet 1

HUGH D. SMITH,
INVENTOR

BY Eaton, Bell, Hunt & Seltzer

ATTORNEYS

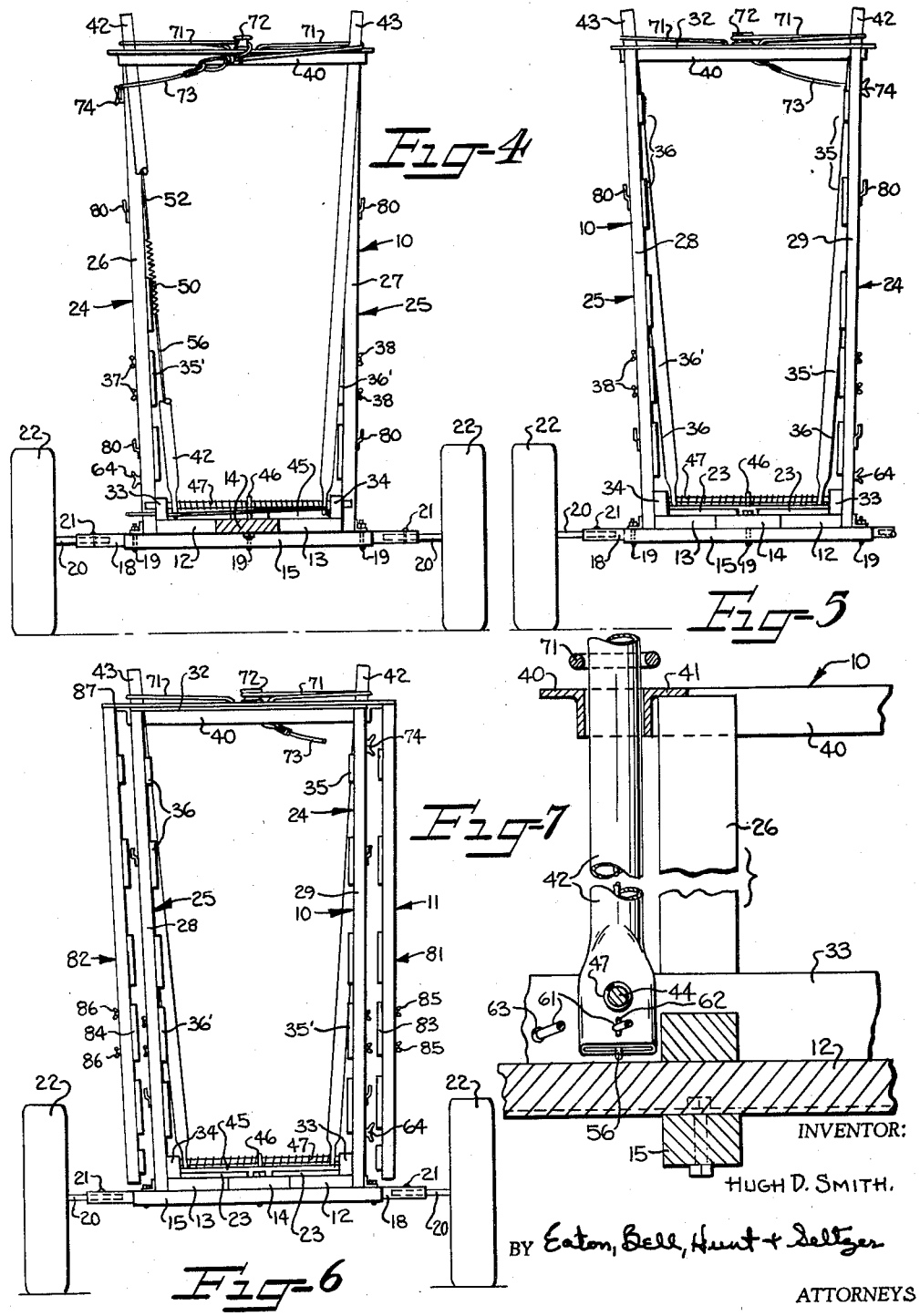

May 10, 1960 H. D. SMITH 2,935,965
PORTABLE CHUTE

Filed May 9, 1956 3 Sheets-Sheet 3

INVENTOR:
HUGH D. SMITH.

BY Eaton, Bell, Hunt + Seltzer
ATTORNEYS

United States Patent Office 2,935,965
Patented May 10, 1960

2,935,965

PORTABLE CHUTE

Hugh D. Smith, Conover, N.C.

Application May 9, 1956, Serial No. 583,721

4 Claims. (Cl. 119—82)

This invention relates to chutes, and more particularly to such chutes which are intended to be transported from place to place for inspecting and vaccinating cattle or the like.

Heretofore, cattle chutes for inspecting and vaccinating animals have not been fully satisfactory since the means for constraining the animal in the chute usually consisted of a pair of stanchions adapted to engage the neck portions of the animal, one of which stanchions was pivotally mounted with the other being fixedly positioned. This arrangement made it quite difficult to securely position the animal in the chute Furthermore, the animals would not readily leave the chute upon completion of the inspection since the stanchions could not be moved completely out of the way of the animals.

One attempt to provide a more satisfactory chute for inspection and vaccination of animals comprised pivotally mounting both stanchions. However, this arrangement did not permit the animals to readily move out of the chute since lower portions of the stanchions extended into the path of travel of the animal which sometimes caused the animals to trip and many times caused the animals to be reluctant to leave the chute.

Therefore, the primary object of this invention is to provide an improved chute having open ends with improved means at the front end for engaging the neck portion of any size animal to prevent the animal from leaving the chute until the animal has been inspected or vaccinated as the case may be which means is mounted to be moved to the sides of the chute completely out of the path of an animal leaving the chute.

Another object of the invention is to provide a gateless main chute having means at the front end thereof for engaging opposite sides of the neck of the animal to restrain the animal and to prevent the animal from moving out of the chute until the animal has been vaccinated or inspected and wherein an auxiliary or guide chute is detachably secured to the rear end of the main chute for guiding animals therein and wherein the auxiliary or guide chute has an open bottom to permit the same to be telescopically received over the main chute when it is desired to transport the chute to another location.

A further object of the invention is to provide readily detachable wheels for the main chute to readily permit the main chute to be lowered to rest upon the surface of the earth and wherein the main chute and the auxiliary or guide chute are each provided with a readily removable slat on opposite sides of the chute to permit the ventral or lower regions of the animal to be readily inspected.

A more specific object of the invention is to provide as the means for engaging the opposite sides of the neck of the animal at the front of the main chute, a pair of hollow stanchions which have their lower ends slidably mounted on a rod to permit the same to be moved inwardly toward each other for engaging the animal and to be moved outwardly adjacent the sides of the chute to permit the animal to leave the chute and wherein the upper ends of the stanchions are positioned in a track for guiding the same, and wherein spring means are provided for normally urging the stanchions into cattle disengaging position and wherein the upper and lower ends of the stanchions are provided with cables or ropes for moving the stanchions towards each other into cattle engaging position.

Some of the objects of the invention having been stated, other objects will appear as the description proceeds, when taken in connection with the accompanying drawings, in which—

Figure 4 is an enlarged front elevation of the main chute taken along line 4—4 of Figure 1;

Figure 5 is a rear elevation of the main chute looking at the opposite side from Figure 4 with one of the wheels removed;

Figure 6 is a rear elevation similar to Figure 5 and showing the auxiliary or guide chute being telescopically positioned over the main chute in transport position;

Figure 7 is an enlarged vertical section taken substantially along line 7—7 of Figure 2 with parts broken away for purposes of clarity and showing the manner in which the stanchions or upright posts have their upper and lower ends slidably guided to be moved into cattle engaging and disengaging position;

Figure 1:
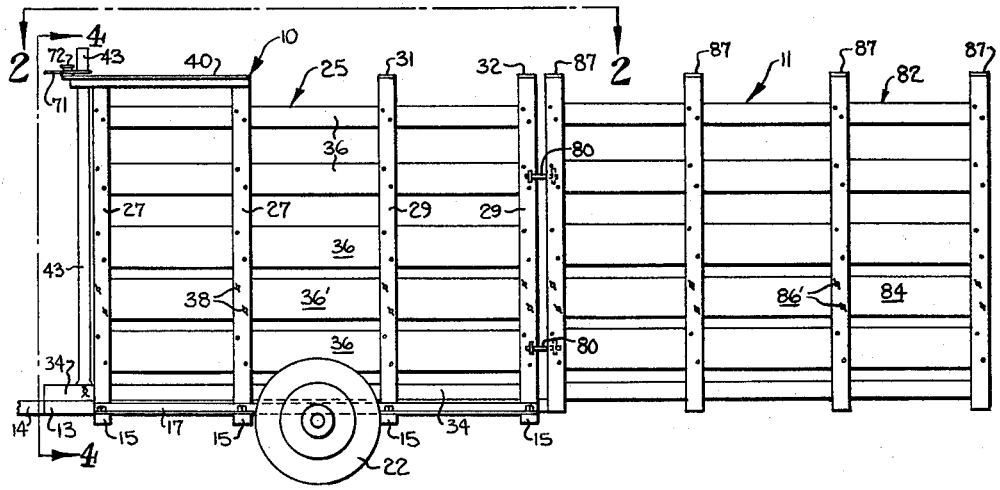
Figure 1 is a side elevation showing the auxiliary or guide chute secured to the rear end of the main chute.
Figure 2:
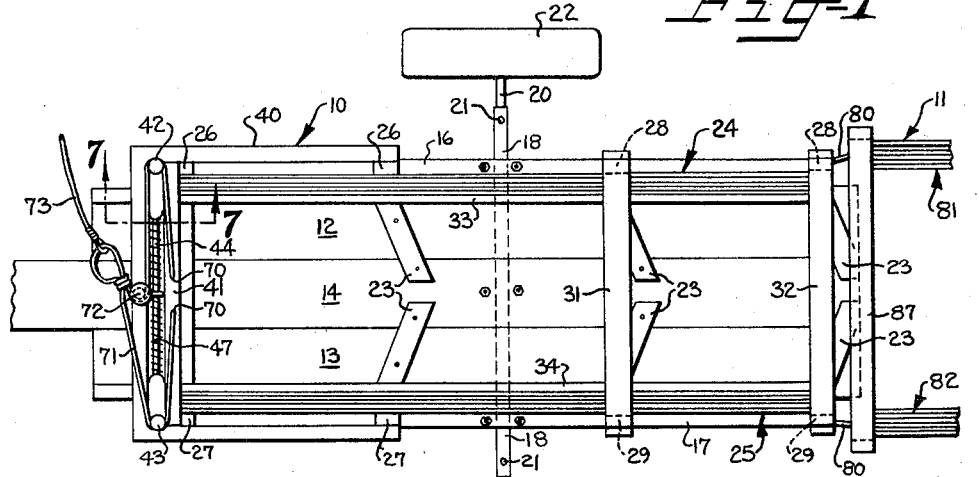
Figure 2 is an enlarged top plan view taken substantially along line 2—2 of Figure 1.

Now referring more specifically to the drawings, particularly Figures 1 and 2, reference numeral 10 broadly indicates the main chute and reference numeral 11 broadly indicates the auxiliary or guide chute detachably secured to the rear end of the main chute.

The main chute 10 has an enclosed bottom formed by longitudinally extending spaced apart planks or boards 12 and 13 between which is positioned a board or plank 14, the forward or outer end of which serves as the tongue to permit the chute to be moved or pulled by a prime mover when it is desired to transport the same. The boards or planks 12, 13 and 14 are suitably secured to cross members or transverse members 15 positioned therebelow. Bracing members 16 and 17 in the form of angle irons extend along the outer side of the main chute adjacent the bottom thereof and are suitably connected as by bolts or screws to the outer ends of the cross members 15.

A hollow axle 18 is secured to the under side of the main chute 10 by U-members or hooks 19 (Figure 4) which penetrate the bracing members 16 and 17 and are suitably secured thereto as by threaded nuts. Wheels 22 are rotatably mounted on the outer ends of stub shafts or axles 20. The axles 20 are of a reduced diameter to be received in the opposite ends of the tubular shaft 18, and pins 21 provided with conventional lock springs prevent disengagement of the stub shafts therefrom. It is apparent that the wheels serve for transporting the chute in elevated position.

Pairs of wooden cleats 23 are suitably secured to the upper surface of the bottom wall of the chute to provide traction for cattle moving through the chute. As will be observed in Figure 2, the pairs of cleats 23 comprise spaced apart rearwardly converging members, the positioning of which serves to facilitate the cleaning and washing of the floor of the chute by readily permitting the water and foreign material carried thereby to flow rearwardly along the medial portion of the floor between the cleats.

The main chute 10 is provided with identical sides broadly indicated at 24 and 25. It will be observed in Figures 4, 5 and 6 that the sides are so arranged to be closer together at the bottom than at the top or to diverge upwardly to readily accommodate all sizes of animals from the smallest calf to the largest cow or bull and yet permit the ventral or lower portions of the animal to be as close as possible to the side walls of the chute for ready inspection of the same.

The sides 24 and 25 (Figure 2) each have a front pair of upright frame or post members 26 and 27, respectively, and a rear pair of post members 28 and 29, respectively. Upper cross members 31, 32, connect the upper ends of the pairs of post members 28 and 29 together to give added rigidity to the rear portion of the chute and to prevent an animal from knocking over the sides of the chute. To brace the lower ends of the pairs of upright post members, longitudinally extending members 33 and 34 are provided which are suitably secured to the floor of the chute and to the inner surface of the lower ends of the post members. Spaced apart slats 35 and 36 on opposite sides of the chute connect the posts 26, 28 and 27, 29, respectively.

Figure 3:
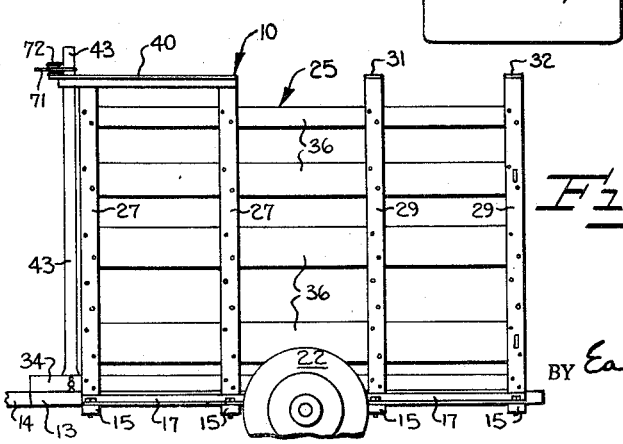
Figure 3 is a side elevation of the main chute with parts broken away for clarity and showing one of the lower slats of the side wall thereof removed to readily permit the inspection of the ventral region of an animal in the chute.

It will be observed in Figures 1 and 3 that the slats are of a decreasing width from the bottom to the top of the sides of the chute and spaced further apart from each other at the top than the bottom. This particular arrangement provides for added strength at the bottom of the chute to prevent an animal from kicking through the sides thereof and to permit a saving of material at the upper portion of the chute wherein there is no danger of an animal breaking slats. It should be noted that the slats in the bottom portion of the chute are positioned close enough together to not only give added rigidity to the bottom portion of the chute, but also to prevent the likelihood of an animal being injured by getting his foot caught between the slats.

It will be observed in Figures 1, and 4 to 6 that the opposite sides 24, 25 of the chute are each provided with a slat 35′, 36′ adjacent the lower portion thereof which slats are readily removable to permit the ventral or lower regions of the animal to be readily inspected. Wing nuts 37, 38 secure these slats 35′, 36′ to their respective upright posts to permit the quick removal of the slats therefrom when desired. Figure 3 shows the side of the chute with the slat 36′ removed.

A U-shaped member 40 is suitably secured to the upper ends of the pairs of upright posts 26 and 27 at the front of the chute to brace the upper portions thereof. A transverse member 41 is spaced inwardly from the front end of the member 40 with its opposite ends secured to the member 40 to cooperate with the proximal surface of the member 40 to provide a track or guide for the upper portions of upright stanchions or posts 42 and 43. The U-shaped member 40 and member 41 are preferably formed from angle iron to rigidly brace the front upper portion of the chute and to provide a smooth engaging surface for the stanchions 42 and 43 to slide between.

The stanchions 42 and 43 serve in place of a gate at the front portion of the chute for engaging opposite sides of the neck portion of an animal for holding an animal in position while being inspected or vaccinated. As will be observed in Figures 8 and 9, the upright stanchions are formed from hollow or tubular posts having flattened lower end portions provided with bores to permit the same to be slidably mounted on a guide shown in the form of a rod 44. The rod 44 has its opposite ends suitably secured to the longitudinally extending re-inforcing members 33 and 34.

A T-shaped block 45 (Figures 8 and 9) overlies the plank or flooring 12, 13 and 14 at the front of the chute and is suitably secured thereto to further brace the front end thereof. The forward most extending portion of the T-shaped block 45 serves to act as a medial support for the rod 44 and its opposite sides serve to act as stops for the lower ends of the stanchion members 42 and 43 when the same are moved into engagement with an animal as indicated by the dotted line position of the stanchions in Figure 8. It should be noted that the block 45 also serves to position the stanchions in spaced relation to the floor of the chute to permit the same to be freely moved on the rod 44.

A hook 46 engages a medial portion of the rod 44 with its shank penetrating the T-shaped member 45 and planking 14 to anchor the T-shaped member to the flooring and to prevent longitudinal movement of the rod 44.

Figures 8, 9:
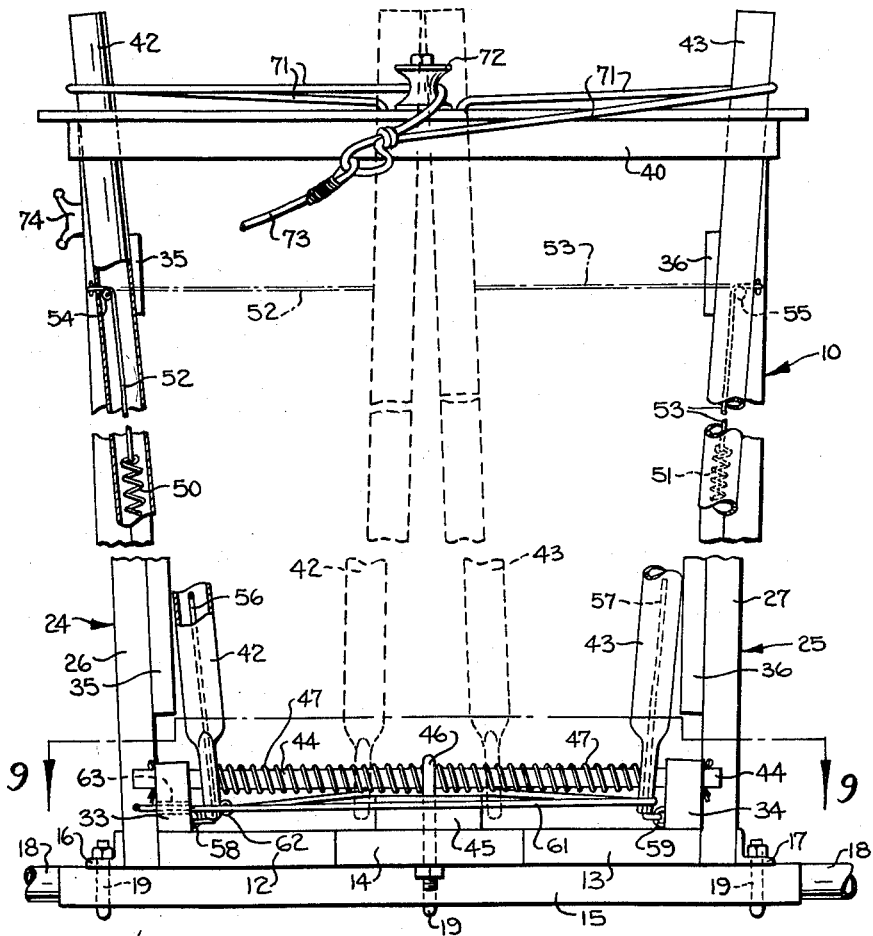
Figure 8 is a front elevation similar to Figure 4 on an enlarged scale with parts broken away for purposes of clarity and showing in dotted lines the cattle engaging position of the stanchions.
Figure 9 is a fragmentary horizontal section taken along line 9—9 in Figure 8.

An expansive resilient means shown in the form of a spring 47 encircles the rod 44 and has its opposite ends engaging the lower portion of the stanchions 42, 43 to normally maintain the stanchions in the position shown in solid lines in Figure 8 against the sides of the chute to prevent engagement with the neck portion of an animal.

To aid the spring 47 in normally maintaining the stanchions in a spread apart position, expansive resilient means shown in the form of springs 50, 51 are positioned inside the respective hollow stanchions and cords 52, 53 have their lower ends secured to the upper ends of the springs with the cords being guided over pulleys 54, 55 and through openings in the walls of the stanchions with the outer end of the cords being secured to the adjacent upright posts 26, 27 respectively. Upper ends of cords 56, 57 connect the lower ends of the springs 50, 51 on the respective stanchions, which cords extend through openings provided in the lower ends of the stanchions with the lower ends of the cords being secured to hooks 58, 59, secured to the front portions of the longitudinally extending reinforcing members 33, 34, respectively.

It is apparent that the spring 47 mainly serves for moving the lower ends of the stanchions into spaced apart relation while the springs 50, 51 serve mainly for moving the upper ends of the stanchions apart. However, the particular arrangement of the springs 50, 51 is such that they alone would move the lower as well as upper ends of the stanchions into spaced apart relation, but to obtain smooth sliding movement of the stanchions on the rod 44 it is preferable to employ spring 47.

One end of a pliable element such as a cord or cable 61 is suitably secured by a hook or screw eye 62 (Figures 8 and 9) to the lower end of the stanchion 42 with the cord extending inwardly therefrom and guided around the outer surface of the lower portion of the stanchion 43 and back through an opening or bore 63 provided in the member 33. It should be noted that the hook or screw eye 62 is positioned below the rod 44 to aid in maintaining the cord 61 in relaxed position below the rod 44 out of the way of an animal leaving the chute. It is apparent that upon the cord 61 being pulled that the lower ends of the stanchions 42, 43 will move from the solid line position shown in Figure 8 to the position shown therein in dotted lines to move the stanchions into engaging relation with an animal after which the cord 61 is suitably secured to a hook 64 provided on the lower portion of the adjacent upright post 26 to prevent the stanchions from disengaging the animal.

To move the upper ends of the stanchions 42, 43 into cattle engaging position, a pliable element such as a cord or cable 71 is provided with its opposite ends suitably secured in spaced apart bores 70 (Figure 2) provided in the upper cross member 41, and with opposite reaches engaging the outer surface of the stanchions at their upper ends. A pulley 72 suitably mounted on the medial portion of the U-shaped member 40 guides one reach of the cord or cable 71 to permit both stanchions to be moved into cattle engaging position simultaneously upon an outward pull being exerted on a cord or cable 73 secured to a looped portion in the cord or cable 71. After the stanchions have been moved into cattle engaging position, the cord 73 is wrapped around a cord retaining hook 74 secured to the upper portion of the adjacent upright member 26.

It is apparent that the particular arrangement for moving the upper ends of the stanchions 42, 43 into cattle engaging position insures that the stanchions will be moved toward each other from the opposite sides of the chute at the same rate of speed so as to insure that the animal will be positioned in the medial portion of the chute to be readily inspected from either or both sides.

In normal operation when using the chute with large mature animals, the cord 61 is pulled and secured and the stanchions then resemble a big V. Then, the cord 73 is pulled to move the upper ends of the stanchions together with a snap like action to tightly engage the neck of the animal. However, for yearlings, the cord 61 remains secured at all times and only cord 73 is operated since the yearlings will jump through the big V. It is common knowledge to cattle men that cattle will follow each other more readily than if each is driven alone into a chute. For this reason, the auxiliary or guide chute 11 is provided which is detachably secured to the rear end of the main chute 10 by hooks or hinges 80.

The guide chute 11 is constructed substantially the same as the main chute 10 except that it is wider and has an open bottom for purposes shortly to be explained. Reference numerals 81, 82 designate the opposite sides of the auxiliary chute and it will be observed that each side is provided with removable slat members 83, 84 suitably secured to the upright members by wing nuts 85, 86, respectively, to permit the ready removal of the same to permit the ventral or lower regions of the animals to be readily inspected. These slats are the equivalent of the removable slats 35', 36' in the main chute 10 but would only be removed when it is desired to examine or vaccinate several animals at one time. It is contemplated that the slats 83, 84 will not be removed too often since no means are provided for engaging and holding the animal in the guide chute as in the main chute. A plurality of upper cross members 87 connect the opposing upright posts of the side members together.

It will be observed in Figures 2, 5 and 6 that the guide chute 11 is formed with upwardly diverging side members similar to the main chute 10 except that the guide chute is slightly wider than the main chute 10. This permits the guide chute 11 to be detached from the rear end of the main chute when it is desired to telescopically position the guide chute over the main chute 10 as shown in Figure 6 to permit the same to be transported. It will be observed that the cross members 87 on the guide chute 11 rest on the U-shaped member 40 and cross members 31 and 32 on the main chute when the guide chute is in position to be transported.

When the portable chute shown in Figure 6 is transported to a suitable location to be used for inspecting and vaccinating animals, to place the same in operation, it is first necessary to slide the guide chute 11 off the main chute 10 after which the wheels 22 are removed from the main chute 10 to permit the same to rest on the surface of the earth. Now, the auxiliary chute is connected by the hinges or hooks 80 to the rear portion of the main chute and the chute is in condition to be used.

Cattle are now driven into the guide chute and upon the neck portion of the animal being positioned between the opposing stanchions 42, 43, the cords 73 and 61 are pulled to move the stanchions towards each other to engage opposite sides of the neck portions of the animal after which the cords are tightly secured to the cord hooks 74 and 64. If the ventral or lower region of the animal is to be inspected, one or more of the readily removable slats 35', 36', 83 and 84 will have already been displaced prior to the animals being driven into the chute.

Upon the completion of the inspection or vaccination of the animal, the cord or cables 61 and 73 are released from their respective hooks 64 and 74 to permit the springs 47, 50 and 51 to return the stanchions to a spread apart position to permit the animal to move out of the main chute.

It is contemplated that the main chute 10 may be used as a trailer for hauling an animal and that the main chute and guide chute may be used as a loading chute for loading animals onto other conveyances.

Accordingly, it is thus seen that there has been provided an improved portable cattle chute which may be readily transported and quickly placed into operation and wherein the means for engaging the animals is so positioned that it will not trip or interfere with the movement of the animals from the chute.

In the drawings and specification there has been set forth a preferred embodiment of the invention and, although specific terms are employed, they are used in a generic and descriptive sense only, and not for purposes of limitation, the scope of the invention being defined in the claims.

I claim:

1. An open-ended chute having a bottom and spaced apart upwardly diverging side walls, means positioned adjacent one end of said chute for engaging the neck portion of an animal, said means comprising a pair of hollow stanchions having upper and lower ends, a track extending transversely between the upper portions of said side walls and secured thereto for guiding the upper end of said stanchions therein, a rod loosely penetrating the lower end portions of said stanchions and having its opposite ends secured to said side walls, said rod being positioned in spaced relation to the bottom of the chute to maintain the lower ends of the stanchions out of engagement with said bottom, a spring surrounding said rod and positioned between said stanchions for normally maintaining the lower ends of said stanchions in spaced apart relation, a first independently operable pliable element having its opposite ends secured to a medial portion of said track and having opposite reaches thereof engaging the outer surfaces of the upper portions of said stanchions, a pulley positioned on the medial portion of said track spaced from the ends of the pliable element, one reach of the pliable element being guided by said pulley whereby upon an outward pull being exerted to said pliable element the upper ends of the stanchions will be moved towards each other at the same rate of speed independent of movement of the lower ends of the stanchions, and a second independently operable pliable element having one end secured to the lower end of one of said stanchions and looped around the outer surface of the lower portion of the other stanchion whereby upon said second pliable element being pulled the lower ends of said stanchions will be moved towards each other to prevent an animal from leaving the chute.

2. A chute according to claim 1 wherein a spring is positioned inside of each stanchion, and means connecting opposite ends of said springs with the side walls of the chute to thereby aid the spring positioned between the lower ends of said stanchions in normally maintaining the stanchions in spaced apart relation.

3. An open-ended chute having a bottom and spaced-apart upwardly diverging side walls, means positioned adjacent one end of said chute for engaging the neck portion of an animal, said means comprising a pair of upright stanchions, means secured to the upper portions of the side walls of the chute and straddling the upper ends of said stanchions for serving as a guide therefor during movement of the stanchions, a rod loosely penetrating the lower end portions of said stanchions and having its opposite ends secured to the chute, said rod being positioned in spaced relation to the bottom of the chute to maintain the lower ends of the stanchions out of engagement with the bottom of the chute, a spring surrounding said rod and positioned between said stanchions for normally maintaining the lower ends of the stanchions in spaced-apart relation, independently operable means connecting the upper ends of said stanchions for moving the upper ends of the stanchions towards each other, and independently operable means connecting the lower ends of said stanchions for movement relative to each other whereby either end of the stanchions may be moved independently of the other end thereof.

4. An animal restraining device comprising a pair of generally upright stanchions, a supporting frame therefor including upper and lower guides operatively associated respectively with the upper and lower portions of said stanchions, an expansive resilient means operatively associated with opposed portions of said stanchions for urging the same apart, and pliable stanchion operating elements independently operatively associated with upper and lower portions respectively of said stanchions to independently pull the same toward each other to engage the neck of an animal.

References Cited in the file of this patent

UNITED STATES PATENTS

| | | |
|---|---|---|
| 1,332,132 | McGinnis et al. | Feb. 24, 1920 |
| 2,408,872 | Newbold | Oct. 8, 1946 |
| 2,557,477 | Simon | June 19, 1951 |
| 2,571,487 | Rolfe et al. | Oct. 16, 1951 |
| 2,680,425 | Hagel | June 8, 1954 |
| 2,683,441 | Beall | July 13, 1954 |
| 2,703,554 | Haggard et al. | Mar. 8, 1955 |
| 2,754,802 | Patterson | July 17, 1956 |